United States Patent [19]
Kämpf

[11] Patent Number: 5,766,461
[45] Date of Patent: Jun. 16, 1998

[54] DEVICE FOR MAGNETICALLY TREATING A FLUID

[76] Inventor: Roland Kämpf, Lohstrasse 6, CH-8590 Amriswil, Switzerland

[21] Appl. No.: 448,409

[22] PCT Filed: Feb. 25, 1994

[86] PCT No.: PCT/CH94/00041

§ 371 Date: Jul. 12, 1995

§ 102(e) Date: Jul. 12, 1995

[87] PCT Pub. No.: WO95/09816

PCT Pub. Date: Apr. 13, 1995

[30] Foreign Application Priority Data

Oct. 4, 1993 [DE] Germany ................. 93 15 673.1

[51] Int. Cl.[6] ................................................. C02F 1/48
[52] U.S. Cl. ........................................... 210/222; 210/695
[58] Field of Search .................................. 210/222, 223, 210/695; 123/538; 96/1

[56] References Cited

U.S. PATENT DOCUMENTS

| 4,367,143 | 1/1983 | Carpenter . | |
|---|---|---|---|
| 4,585,553 | 4/1986 | Hikosaka et al. | 210/223 |
| 5,024,271 | 6/1991 | Meihua | 210/222 |

FOREIGN PATENT DOCUMENTS

| 433035 | 6/1991 | European Pat. Off. . |
| 05445395A2 | 6/1993 | European Pat. Off. . |
| 2255293 | 11/1992 | United Kingdom . |
| WO 85/03649 | 8/1985 | WIPO . |
| WO 92/10430 | 6/1992 | WIPO . |
| WO 93/09868 | 5/1993 | WIPO . |

*Primary Examiner*—Matthew O. Savage
*Attorney, Agent, or Firm*—Harness, Dickey & Pierce, P.L.C.

[57] ABSTRACT

The invention relates to a method and a device, in particular for treating a fluid, having at least one multipart housing 1 and at least one permanent magnet 36 which can be mounted on a support body 35, the housing 1 extending at least partly around the external periphery of the support body 35, and adaptor elements, comprising individual magnet supports 22 and orientation retainers 21, for holding a freely selectable number of permanent magnets 36 in the axial direction of the support body 35 are provided with variable overall size. As a result of this, a number of magnets 36 can be selected as a function of the fluid composition and fitted into the housing 1, so that individual matching and optimum action of the magnetic field on the fluid is obtained.

12 Claims, 19 Drawing Sheets

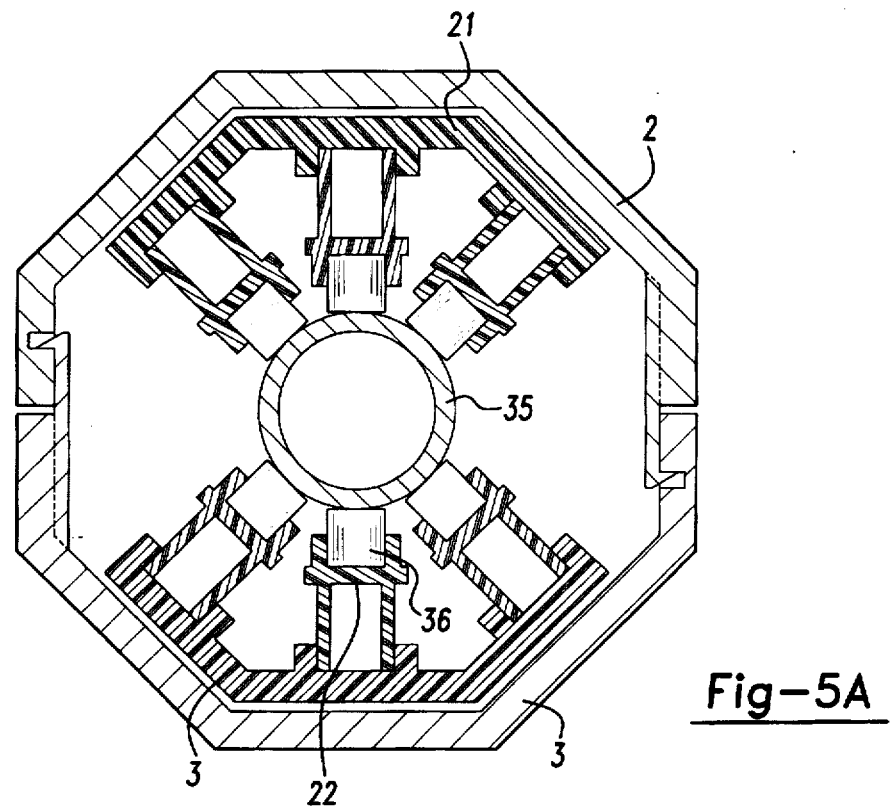
*Fig-5A*
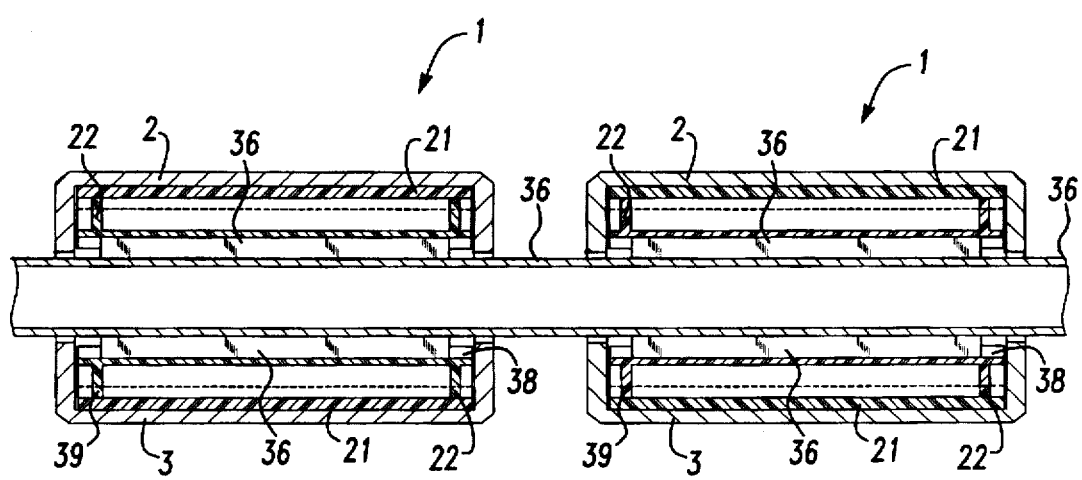
*Fig-5B*  *Fig-5C*

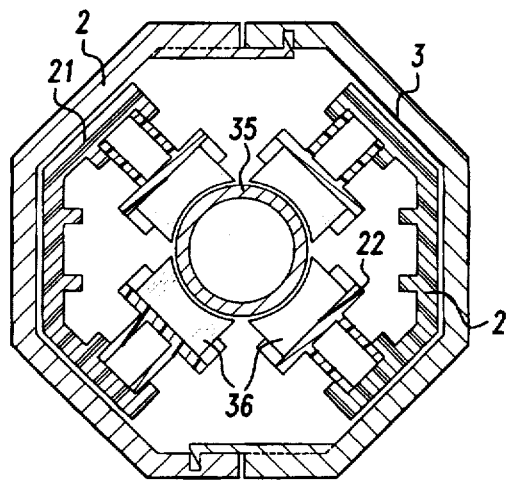
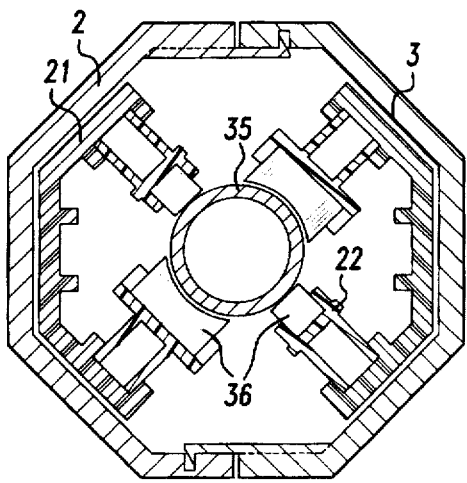
Fig-7A       Fig-7B
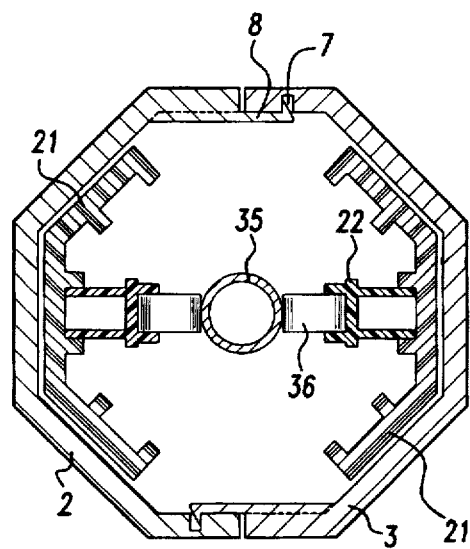
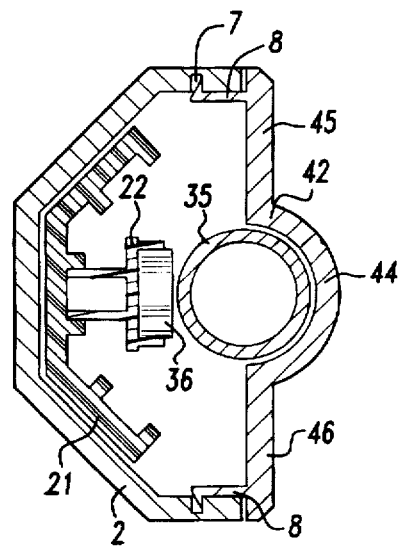
Fig-7C       Fig-7D

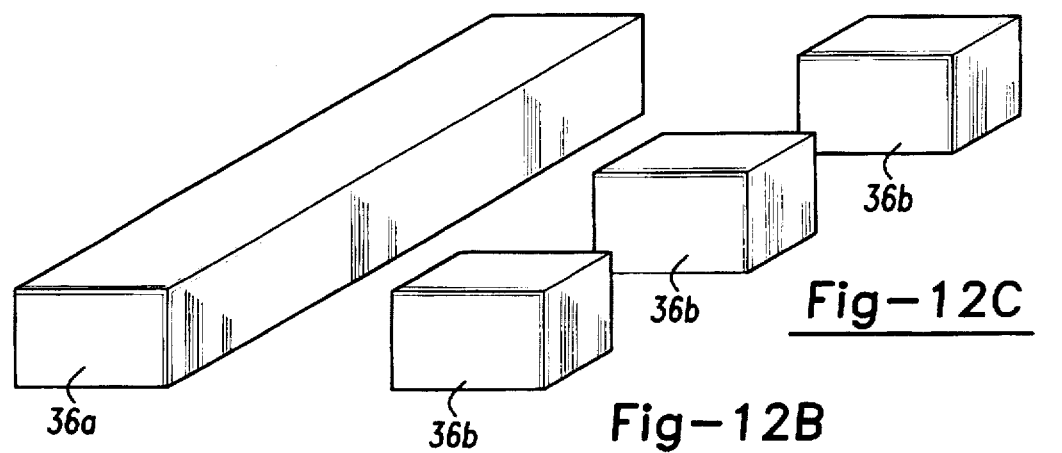
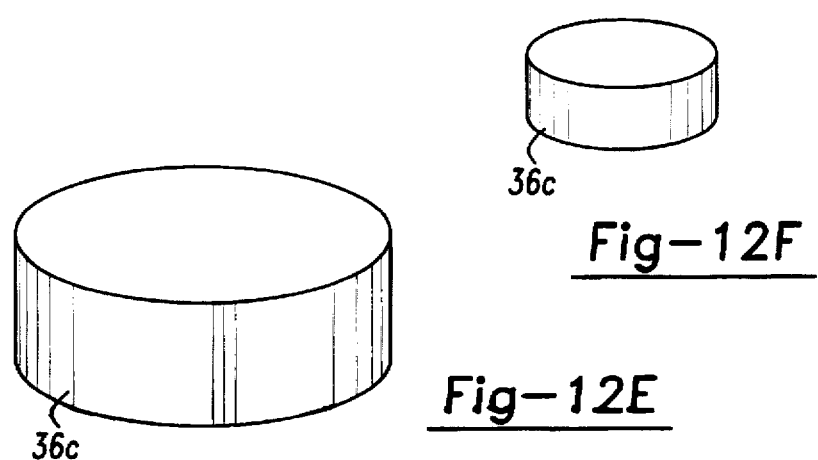

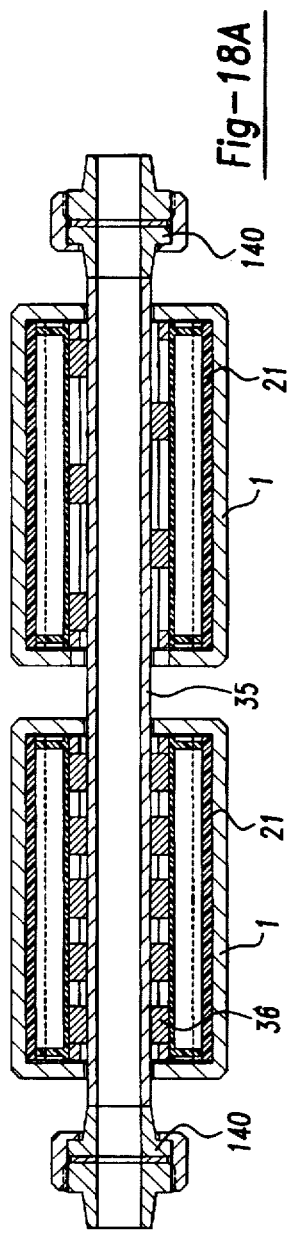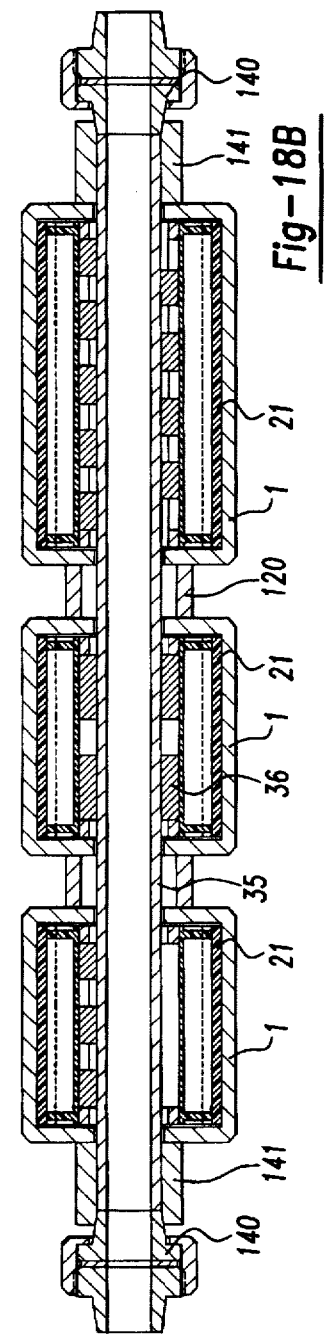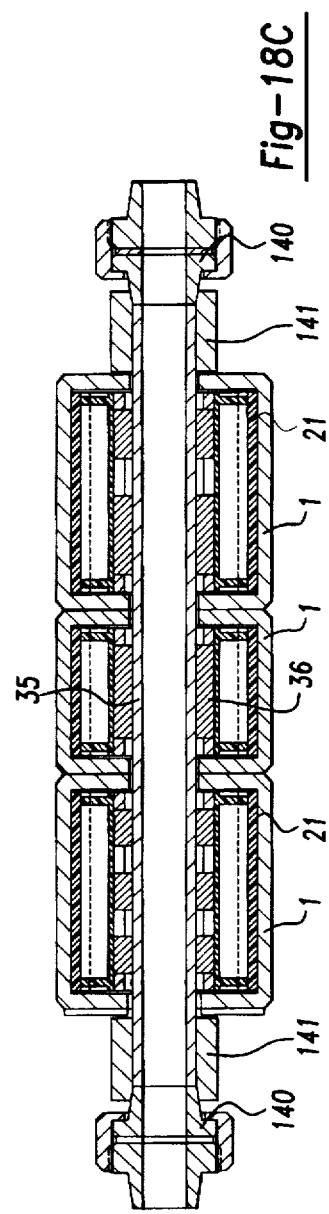

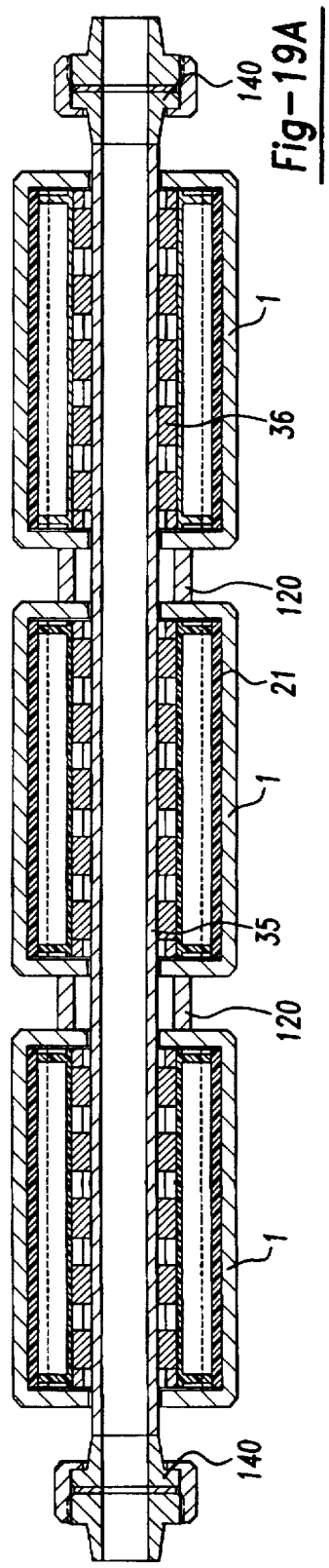
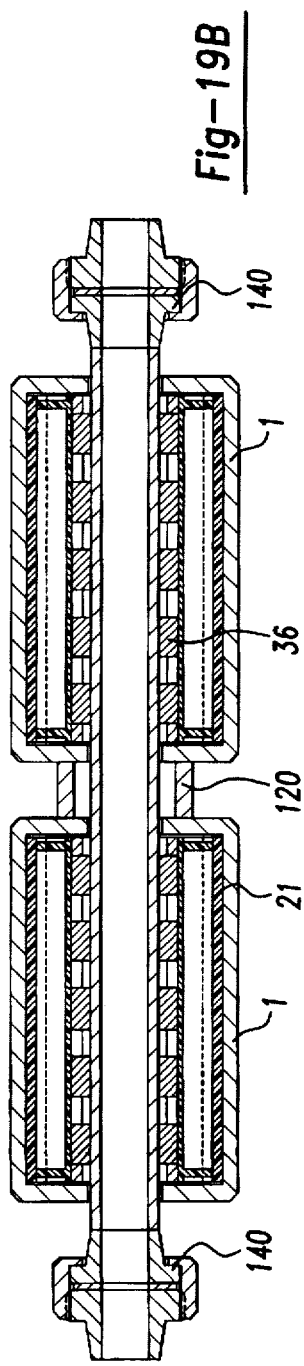
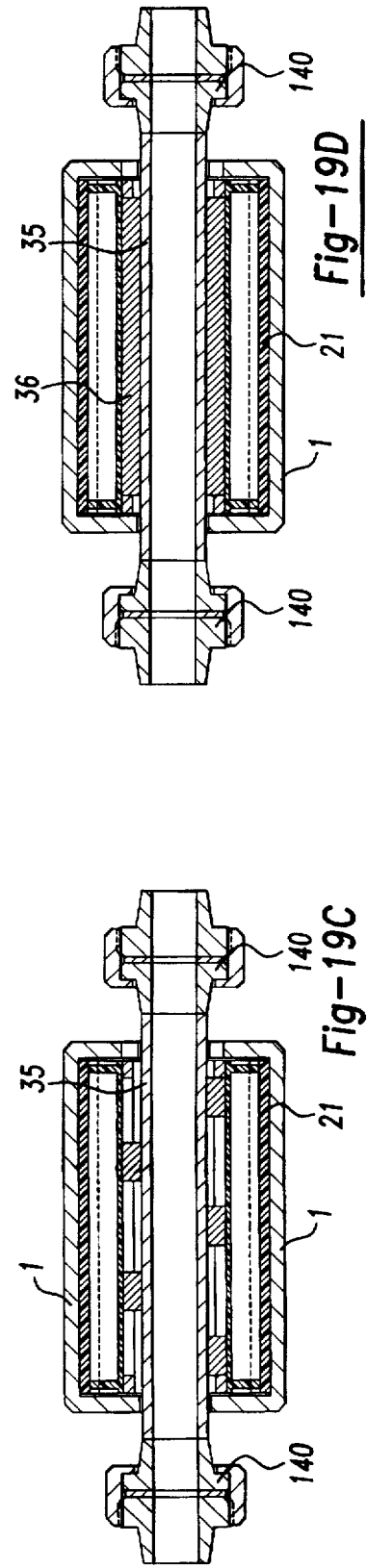
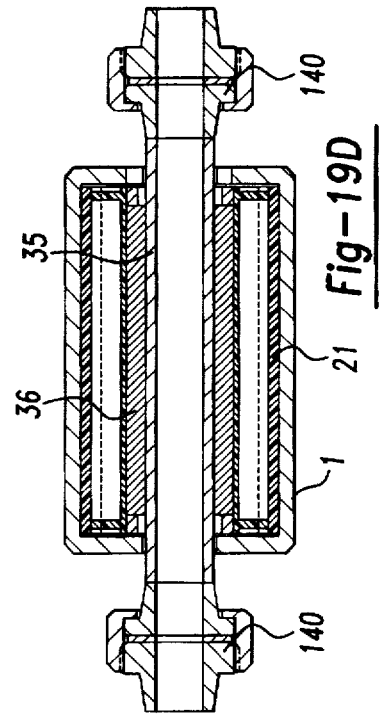

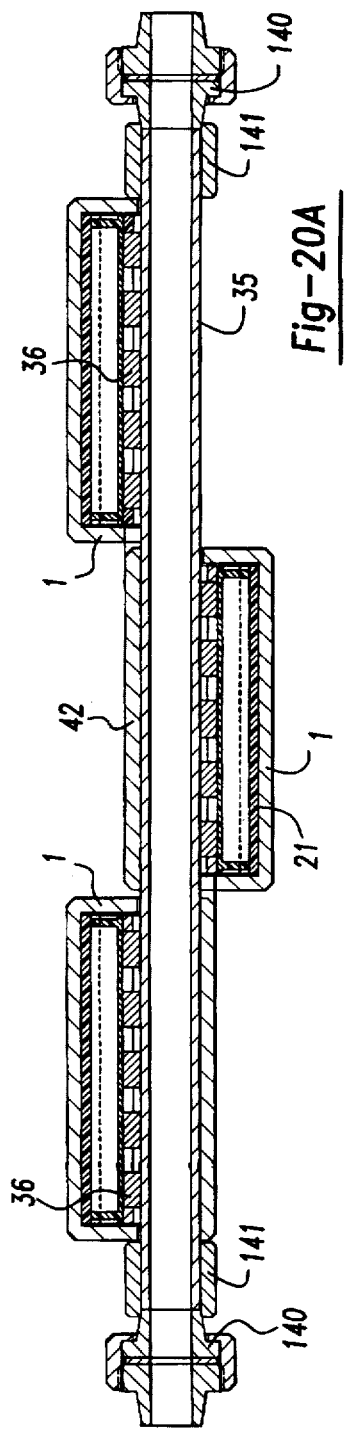
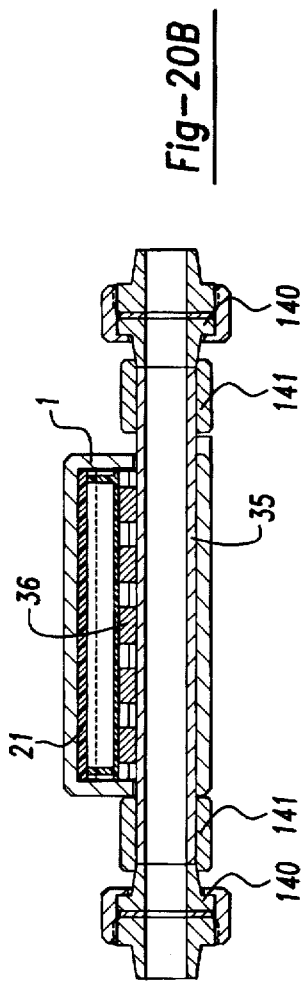
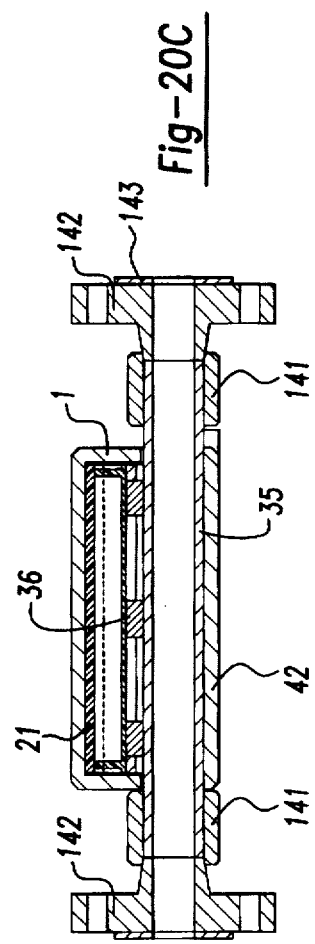

DEVICE FOR MAGNETICALLY TREATING A FLUID

The invention relates to a process for treating a fluid and furthermore to a device, in particular for magnetic fluid treatment, having at least one multipart housing and at least one permanent magnet which can be mounted on a support body.

In the case of relative motion of fluid molecules in a magnetic field, forces act on the dipoles contained in the fluid, on the ions surrounded by hydrate shells or on other charge carriers and polarizable molecules, which forces lead inside the flowing fluid to relative motion of these magnetically influenceable components with respect to the component which cannot or cannot greatly be influenced magnetically. As a result of these demixing processes and concentration changes internal to the fluid in the case of the different fluid charge carriers, altered physico-chemical properties of the fluids result, in particular a temporally limited altered crystallization behavior of calcium salts. It is known to influence different fluids by magnetic fields, in particular by the action of a plurality of magnetic poles on flowing molecules of fluids, use being made, as a rule, of monobloc housings which exploit the fluid motion relative to stationary, positionally fixed permanent magnets. In order to increase the action, a plurality of housings may, if appropriate, be fastened on a tube, the housing being firmly closed and it being possible to carry out a subsequent alteration of the magnetic influence practically not at all or only with great difficulty, because the housing is intended for a specific, originally fixed, magnet arrangement, overall length and design and is delivered by the producers as a closed device. The joining line of the magnetic poles of the permanent magnets used generally lies in a plane perpendicular to the tube axis. The influence exerted by this type of treatment apparatus over the entire magnetically influenceable fluid is therefore very limited.

Utility model G 91 02 938.4 discloses an apparatus for magnetically influencing a fluid, which has a two-part housing and permits subsequent mounting on an existing pipeline or on a conduit section with low expenditure. The housing halves are intended for holding one or more magnets of the same shape and overall size, so that if, because of the predetermined design of the pipeline, it is not possible to arrange a multiplicity of individual housings directly one after the other, then the fluid composition can be influenced only to a limited extent.

Electrostatic or electromagnetic fluid treaters are furthermore known, which can be matched within wide limits to different fluid compositions by adjusting the applied voltage, the pulse strength and pulse frequency or the current and, as a result of their adjustability, have a wide effective range. A disadvantage is that a high degree of technical outlay is required for the necessary adjustment beside the fact that continuous current supply and maintenance is required and possible interferences in the adjustment cannot be ignored.

The object of the invention is therefore to specify a method and a device which allows user-friendly and optimum matching of the magnetic field to the existing fluid composition within wide limits with only small outlay.

In order to achieve the procedural object, the invention proposes that the fluid is exposed to a magnetic field with the aid of permanent magnets, which magnetic field is altered step-wise with regard to the magnetic field strength and the flow section and or depth influenced, as a function of the fluid composition, as a result of which the existing disadvantages of known embodiments are avoided.

In a refinement of the invention, it is proposed that the fluid is exposed to a magnetic field which has a variable pole number, a variable separation from the fluid and a variable extent with regard to the exposed surface.

In order to implement the process, a device according to the invention is provided which is distinguished in that the housing extends at least partly around the external periphery of the support body and the means for holding a freely selectable number of permanent magnets in the axial direction of the support body is provided, with variable overall size.

As a result of this a number of magnets can be selected as a function of the fluid composition and can be fitted into a housing which can be mounted on a support body and belongs to a modular construction system, comprising the housing and of a large number of different permanent magnets as well as corresponding fastening means. By virtue of the selection of the corresponding permanent magnets of the modular construction system, the influence on the fluid can in this case be matched individually to the different types of water, effectiveness requirements, customer and installation requirements, the housing being provided for holding permanent magnets which are arbitrarily selectable with regard to the magnet material, the pole position, the pole orientation and the pole number per magnet and can be combined together, and it being possible to combine together permanent magnets with different dimensions in the housing.

In a further refinement of the invention it is proposed that the support body is a tube or a conduit of a piping system.

In a particular refinement of the invention, it is proposed that the support body is a component of the device and can be fitted substantially as an intermediate part into an existing tube system, it being possible for the support body to distribute the fluid stream into a plurality of, in particular two, partial streams. In this design according to the invention, account is taken of the fact that permanent magnets have only a limited depth action, so that by distributing the fluid and reducing the respective flow cross section, a higher proportion of fluid can be treated or magnetically influenced, so that an improved overall action is obtained. Furthermore, by virtue of this distribution of the fluid stream, a higher number of permanent magnets with the same overall length can be used, the support bodies are designed straight at least in the region of the holder of the housing and are equipped at the ends with straight or bent conventional connection elements, for example flange connections, screw connections or solder connections or can be connected by using union nuts, threaded joints or clamping flange connectors, so that connection to all current tube connections is possible.

In order to rule out reduction of the magnetic field action, it is proposed that the support body is produced from a nonmagnetic material, for example from brass, copper or special steel, in particular from a stable plastic which can be used in the foodstuffs field.

For further increase of the magnetic field action, it is proposed that a plurality of housings are arranged one after the other on the support body in one or more partial streams, it being possible for the housings to be variously fitted with the same or different permanent magnets.

In order to retain a particular axial and, if appropriate, angular position on the support body, it is proposed that the housings are arranged on the support body positionally fixed but rotatable or positionally and rotatably fixed, in the case of the second alternative, it is possible for the housings, for example, to be variously held rotationally fixed by groove/spring or projection/recess combinations on the end faces.

In order to allow subsequent mounting of the housing on an already finished tube or conduit system, it is proposed that the housing comprises at least one half-shell having a cavity for the support body, and that a half-shell is provided with a cover plate or that two half-shells are combined with each other in each case, so that the support body is clamped between the half-shells or between the half-shell and the cover plate, the half shells having a cavity corresponding to the diameter of the support body.

In a further refinement of the invention, it is proposed that the housings, comprising one or two half-shells, have a different length and a basic shape with a round, oval or polygonal, in particular quadrilateral or octagonal cross section or with a cross section having a larger number of vertices in the case of two opposite half-shells.

For the purpose of fast assembly and disassembly of the device onto and from existing pipelines and cost-effective storage with few individual parts, it is proposed that the half-shells are designed substantially with mirror symmetry, the half-shells being held by hooks which project into a corresponding groove on the opposite half-shell or that a screw, rivet, clamp, adhesive, band or weld connection is provided in order to connect the two half-shells.

There is the alternative possibility that the housings or half-shells are axially fastened on the support body by tubular sections, spacer pins which engage in bores or cavities in the housing or half-shells or by bushings with sufficiently large external diameter, or that for accurate positioning of the half-shells, the support body is divided into sections, for example by rings or tube or tube half-sections, which are connected to the support body by press fitting, by welding, adhesive bonding, soldering, fixing screws or springs, it being possible for the rings or tube or tube half-sections to have one or more hook-shaped connections which engage on both sides, in each case in one housing or one half-shell and lead to secure holding of the half-shells on the support body and prevent mutual rotation of the housings relative to each other.

In order to guarantee individual matching of the device to a fluid, it is proposed that in order to produce the magnetic field, permanent magnets with variable size with regard to the diameter or length and width as well as height are provided in block, bar, disk or rod shape, the permanent magnets consisting of weak magnets or high-power magnets, in particular AlSiCo materials, and having a different pole strength, pole structure, i.e. pole number, pole size and pole position, on the outer surfaces.

In order to retain the smallest possible separation between support body and permanent magnets, it is proposed that the permanent magnets may have curved pole faces on the side facing the support body.

In the simplest case, the means for fastening the permanent magnets comprise, for example, grooves, bores or cavities having round, polygonal or elongated shape, which are put directly into the housing and into which the permanent magnets can be clamped.

In a particular refinement of the invention, however, it is proposed that the permanent magnets are held in the housing indirectly by at least one adaptor element which has grooves, bores or cavities for holding the permanent magnets, or that the adaptor element is held in grooves, bores or cavities in the half-shells, in particular so that it can be clamped in, or otherwise connected to the half-shells, for example adhesively bonded. As a result of this, a housing form with, for example, one or two half-shells may be selected, it being possible to carry out depth balancing for different tube diameters by subsequent application of adaptor elements, so that the permanent magnets still have a very small separation from the support body. An adaptor may furthermore be provided for each different magnet, so that after the corresponding magnet selection, the permanent magnet with the associated adaptor need only be clamped into the half-shell, and fast assembly is possible.

In a further refinement of the adaptor element, it is proposed that the adaptor elements are designed at least in two parts, with a magnet support for holding the permanent magnets and an orienting retainer for rotationally fixed positioning of the magnet support in the half-shell of the housing, it being possible, if appropriate, for the magnet support to be designed in two parts, with a first part which has the grooves, bores or cavities for holding the permanent magnets, and a second part which has a plane face onto which the first part can be adhesively bonded and webs for depth balancing between the housing and the support body, so that simple and mechanical fastening of the magnets in the adaptor elements is possible. It may be particularly advantageous if the second part and the orientation retainer are designed monobloc, so that the magnet support can be adhesively bonded onto the orientation retainer.

In a further refinement of the adaptor elements, it is proposed that the orientation retainer comprises a semicircular segment which holds a plurality of, in particular three, magnet supports with permanent magnets preferably in each case rotated through 45 degrees with respect to one another in a rotationally fixed position inside a half-shell. The segment can be clamped into the corresponding indentations in the half-shells and carries, in exactly fixed angular positions, for example with an angular separation of 45 degrees, for example three magnet supports with an equal or different number of permanent magnets, an axial and angular position of each individual magnet being fixed in connection with a rotationally fixed assignment of a plurality of half-shells or housings, so that an accurately defined positional pattern which can no longer be changed without deliberate intention, results along the support body. In the case of using two half-shells with one segment each, six possible magnet support arrangements result in a closed housing, with an angular separation of 45 degrees in one half-shell and an angular separation of 90 degrees between two half-shells, two further positions for magnet supports in the contact plane of the two half-shells being, if appropriate, possible using a bridging adaptor, so that magnet supports are arranged at an angular separation of 45 degrees over the entire periphery of the support body, when viewed in cross section.

The permanent magnets are advantageously held in the half-shells or magnet supports by clamping forces or pressure forces, but it is also readily possible for them to be held by other possible fastening means, for example adhesive, the permanent magnets with their poles having a separation of a few millimeters or no separation from the support body.

The magnet supports, which are advantageously arranged in the longitudinal direction of the support body, are fitted, according to requirements, completely or only partly or, in the case of two magnet supports, alternately or, in the case of a plurality of magnet supports, alternatingly.

The invention is explained in more detail below with the aid of the figures.

FIGS. 5A–5C show three sectional views of two half-shells with orientation holders and magnet supports.

FIGS. 7A–7D show four further sectional side views according to FIG. 6.

FIGS. 12A–12F show a selection of usable permanent magnets.

FIGS. 18A–18C show a plurality of arrangements of housings on a support body.

FIGS. 19A–19D show further arrangements of housings on a support body.

FIGS. 20A–20C show a plurality of arrangements of half-shells with a cover plate on a support body.

Figure 1:
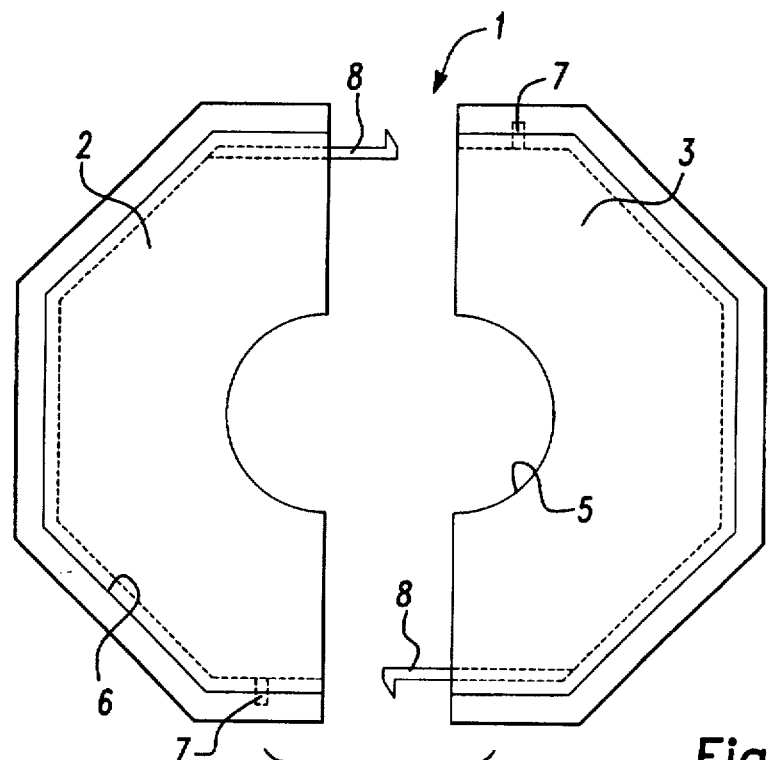
FIG. 1 shows a side view of two opposite half-shells.
Figure 2:
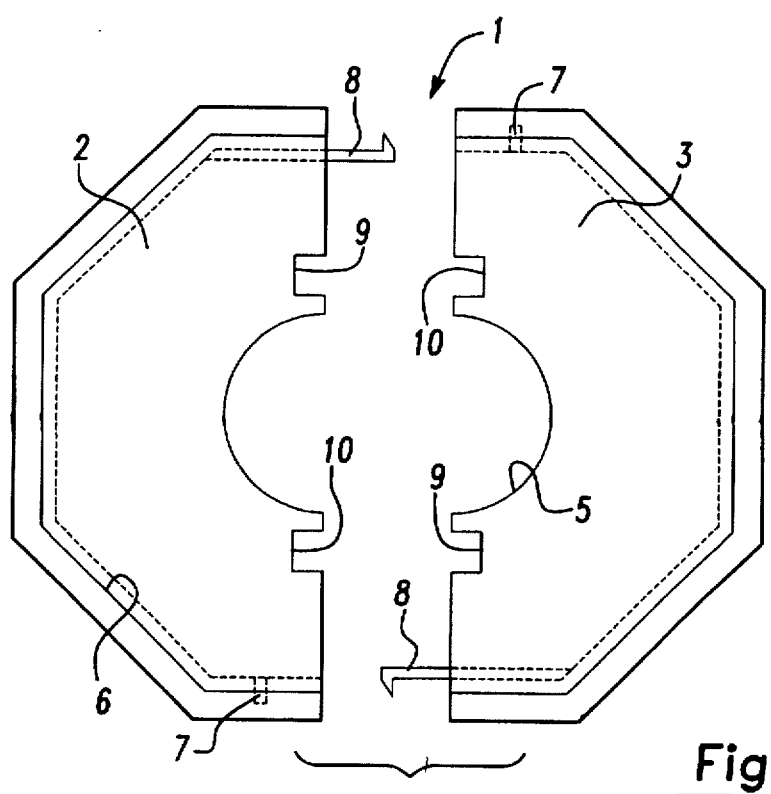
FIG. 2 shows a side view according to FIG. 1 with the possibility of locking.

FIGS. 1 and 2 show a side view of a housing 1 with two opposite half-shells 2, 3 which each comprise a mirror-symmetrical elongated base body having four circumferentially distributed edges and an open side, so that after assembly of the two half-shells 2, 3, a closed housing 1 with an octagonal cross section and two closed end faces results. The octagonal cross-sectional shape of the housing 1 is, however, not obligatory, but any desired other cross-sectional shape, for example a round shape may be selected. In the middle of the base body 1 there is a cavity 5, each half of which extends into the two half-shells 2, 3 and which is provided for holding the support body, not shown in this figure. The two half-shells 2, 3 are freely accessible from the open side 4 and are intended for holding the magnets with corresponding adaptor elements. In order to facilitate assembly, the two half-shells 2, 3 have an axial groove 7 on the inside 6, in which groove a hook 8 protruding from the surface 4 of the half-shells 2, 3 can engage and the two half-shells 2, 3 can be releaseably locked together, so that no further tools are required for assembly or disassembly. It is, however, also conceivable for the two half-shells 2, 3 to be connected together in another way, for example by screw attachment or the like.

Figure 16A:
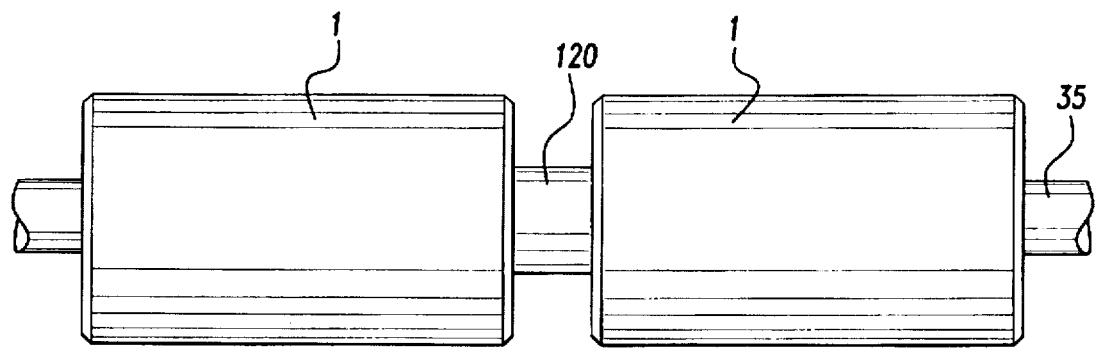
FIGS. 16A and 16B show two views of a spacer for the half-shells.
Figure 16B:
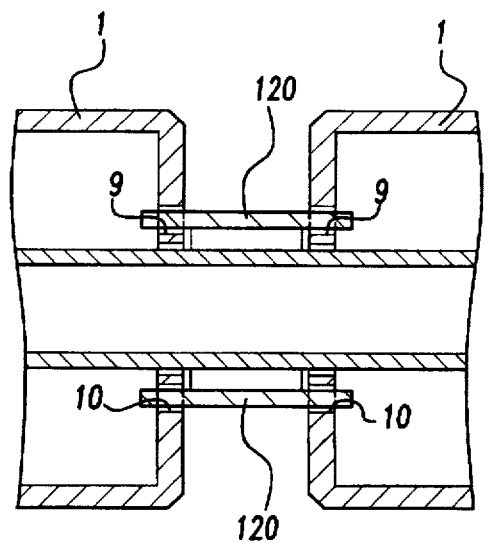
Figure 17A:
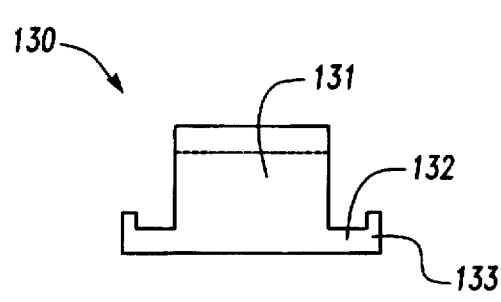
FIGS. 17A–17E show three views of a spacer and two views of the housing with spacer.
Figure 17B:
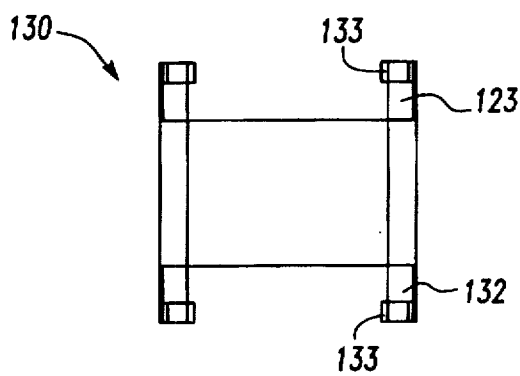
Figure 17C:
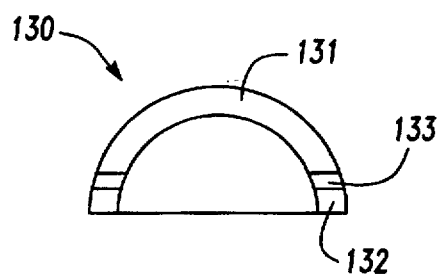
Figure 17D:
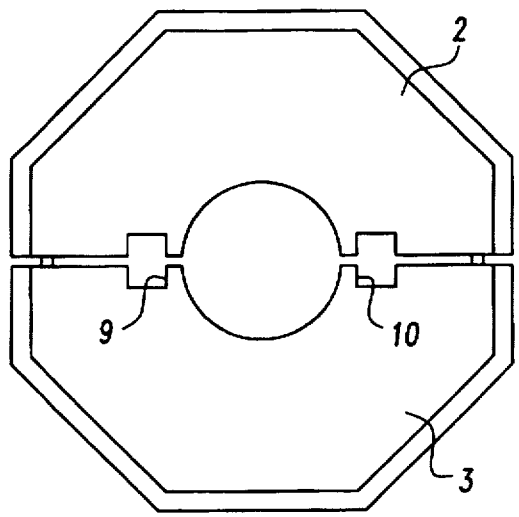
Figure 17E:
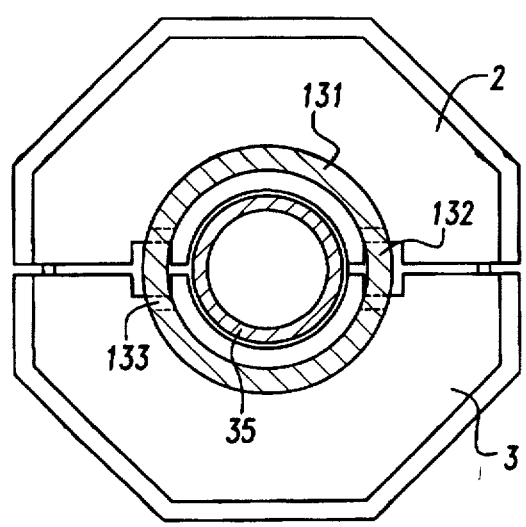

In addition, FIG. 2 shows a further possibility of locking, in the form of a double cavity 9, 10, in order to lock together a plurality of base bodies in rotationally fixed fashion, further auxiliary means, as shown in FIGS. 16 and 17, being able to engage in the cavity 9, 10 for rotationally fixed locking. Alternatively, the half-shells 2, 3 may each be equipped with a cavity 9 and a projection, so that in each case the projection engages into the corresponding cavity 9 for locking together, if no further auxiliary means are provided.

Figure 3:
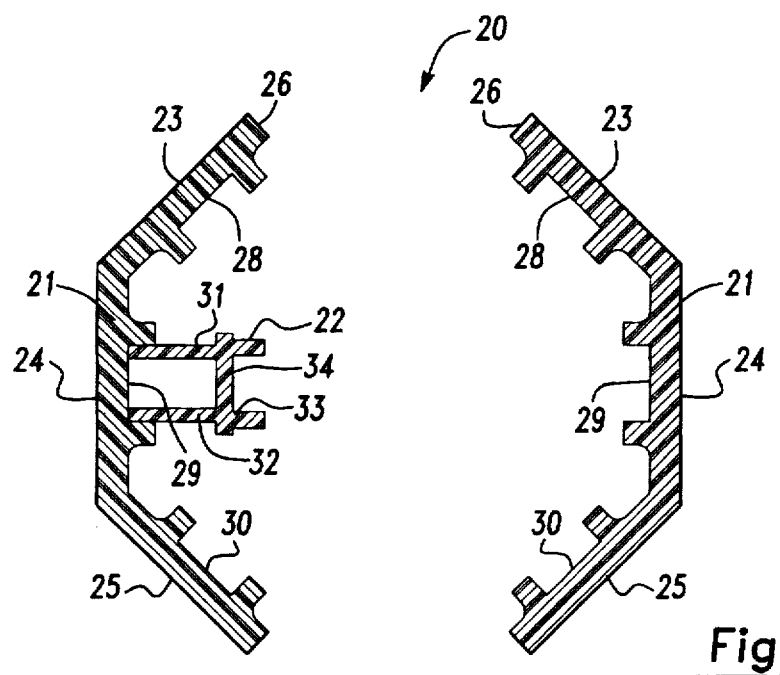
FIG. 3 shows a sectional side view of two orientation retainers with a magnet support.

FIG. 3 shows a sectional side view of two mutually opposite adaptor elements 20 for the magnets, in the form of segmented orientation retainers 21 with a magnet support 22 on the left half of the figure. The orientation retainers 21 are designed the same as each other and have a basic shape correspondingly matched to the cross-sectional shape of the half-shells 2, 3, with three monobloc base sides 23, 24 and 25. The outer surfaces of the base sides 23, 24, 25 may be provided with clampable cavities in the form of grooves and springs, so that the orientation retainers 21 can be fastened in the half-shells 2, 3 very easily. Alternatively, there is the possibility that the orientation retainers 21 are clamped into a projection of the half-shells 2, 3 by their outer edges 26. The orientation retainers 21 shown in FIG. 3 are, in contrast, intended for adhesive bonding into the half-shells 2, 3. Three U-shaped cavities 28, 29, 30, which are formed monobloc, are arranged at an angular separation of 45 degrees in each case, on the angled-off surface which points inwards, which recesses are intended for clampable holding of the magnet supports 22.

Figure 4:
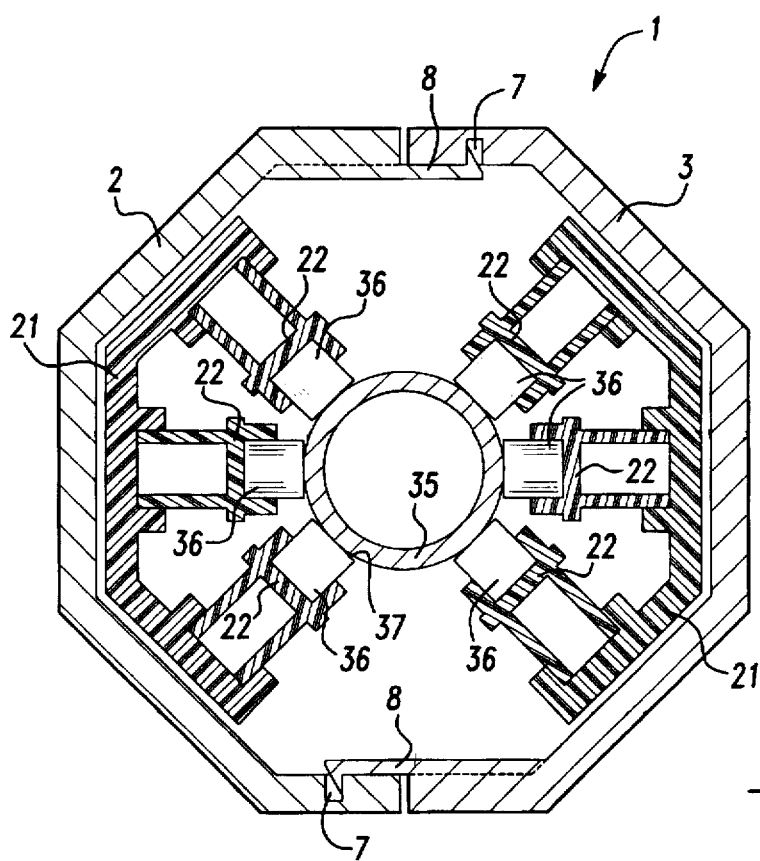
FIG. 4 shows a sectional side view of two half-shells with orientation retainers and magnet supports.
Figure 6A:
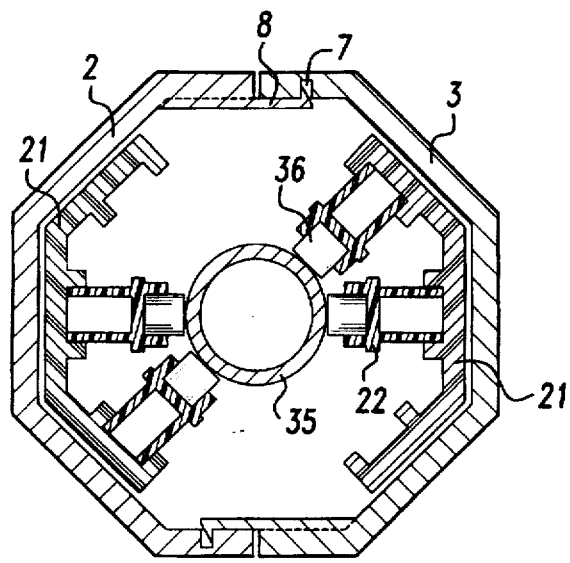
FIGS. 6A–6D show four sectional side views according to FIG. 4 with different fitting of the orientation retainers.
Figure 6B:
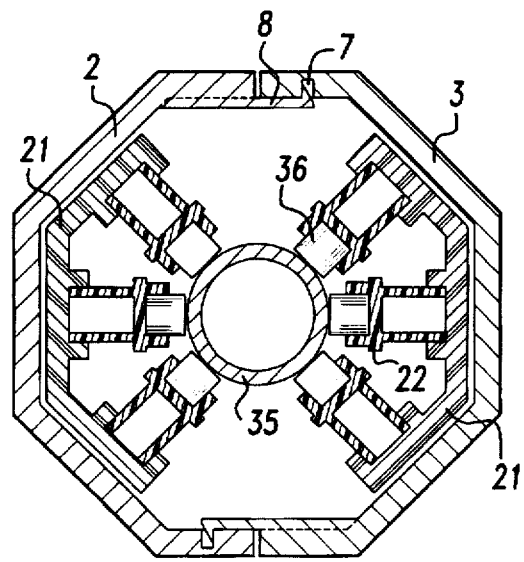
Figure 6C:
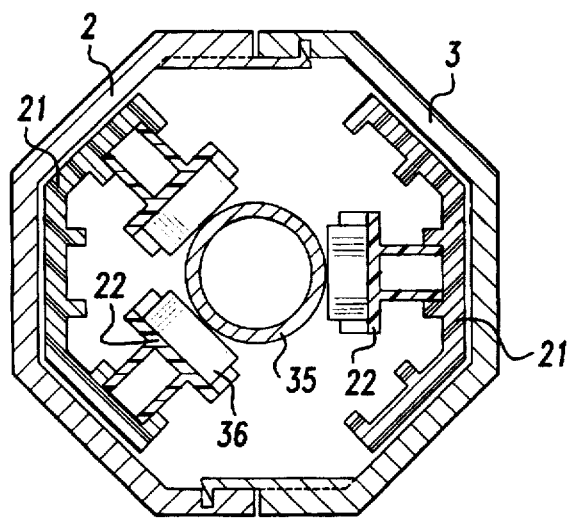
Figure 6D:
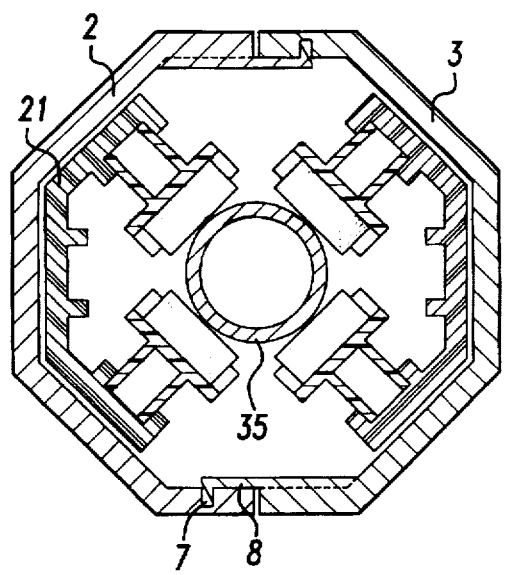

The magnet supports 22 are arranged along the support body 35, as shown in FIG. 4, and have, on the side facing the half-shells 2, 3, two webs 31, 32 which are clamped into the U-shaped cavity 29 of the orientation retainer 21. The webs may in this case have a length correspondingly matched to the length of the half-shells 2, 3 of the support body 35 and of the magnets 36. On the side remote from the half-shells 2, 3, that is to say in the direction toward the support body 35, the magnet support 21 has an essentially rectangular body 33 which is intended for holding the individual magnets and may, corresponding to the magnet shape, have an elongated indentation 34 for bar magnets or a plurality of round indentations for round magnets of different depths. It is also conceivable for a plurality of different magnet supports 21 to be clamped next to one another in the orientation retainer 21, in order to increase the possibility of variation. The various magnets and magnet-holder shapes are represented in FIGS. 12 to 15.

FIG. 4 shows a sectional side view of two assembled half-shells 2, 3 with two orientation retainers 21 and, in all, six fitted magnet supports 22. The half-shells 2, 3 are arranged around a support body 35 and are held together releaseably by means of the cavities 7 and the hooks 8. The two orientation retainers 21 are glued by their outer faces to the base sides 23, 24, 25 in the half-shells 2, 3. One magnet support 22 which carries a magnet 36 is in each case held in the cavities 28, 29, 30. The magnets 36 may be used in disk or bar shape, depending on the shape of the cavity 34, and touch the support body 35 tangentially via their pole face which points inward. It is conceivable for the magnets 36 to be rounded correspondingly to the shape of the support body 35, in order to keep the existing air gap 37 as small as possible, as shown in FIG. 7. Using the orientation retainer 21 and the magnet supports 22, the magnets 36 are exactly positioned with an angular separation of 45 degrees in each half-shell 2, 3. When a plurality of housings or half-shells 2, 3 are used, exact mutual positioning of all the magnets 36 can be obtained using the locking mechanisms known from FIG. 2. It is, however, not necessary for the housing 1 or the half-shells 2, 3 to be fully fitted.

FIG. 5 shows two housings 1 with, in each case, two half-shells 2, 3 according to FIG. 4, in two sectional views on a reduced scale, two housings 1 being arranged adjacently on one support body 35. The support body 35 is, in this exemplary embodiment, represented as a tube of a pipe system, and the magnet supports 22 are fully fitted with rectangular bar magnets 36, the magnet support 22 being designed in two parts. The first part 38 of the magnet support 22 comprises a disk-shaped support in which the indentation 34 for the magnet 36 has been made. The second part 39 has a U-shape with two webs and a plane support face on which the first part 38 is adhesively bonded for easy machine production.

FIG. 6 shows four sectional side views of a housing 1 according to FIG. 4 with, in each case, two half-shells 2, 3 and different fitting of the orientation retainers 21. In the upper-right partial figure, the two orientation retainers 21 are fully fitted with magnet supports 22 and magnets 36. In the upper-left partial figure, the two orientation retainers 21 are only partly fitted with magnet supports 22 and magnets 36, the magnet supports 22 and magnets 36 being in each case opposite in pairs. In the lower two partial figures, the two orientation retainers 21 are selectively fitted with three and four magnet supports 22 and magnets 36 which, however, have a larger diameter or a larger width compared with the upper partial figures.

FIG. 7 shows four sectional side views of a housing 1 according to FIG. 4 with, in each case, two half-shells 2, 3 or one half-shell 2 with a cover plate 42 and a different fitting of the orientation retainers 21. In the upper-left partial figure, the orientation retainers 21 are fitted with the same magnet supports 22 and magnets 36 of equal size, the magnets 36 having a curved pole surface 43 facing the support body 35, with a radius of curvature corresponding to the outer radius of the support body 35. In the upper-right partial figure, the orientation retainers 21 are fitted with magnet supports 22 and magnets 36 which are in each case pairwise different, while in the lower-left partial figure, only one magnet support 22 with one magnet 36 is in each case held in the orientation retainer 21, and the magnets 36 were matched to the smaller support body 35 by arranging the rectangular cross section of the magnets with the largest dimension in the direction toward the support body 35. In the lower-right partial figure, the housing 1 consists of only one half-shell 2 with two grooves 7 and a cover plate 42 which has a rounded portion 44 in the central part, corresponding to the size of the support body 35, and two plane partial surfaces 45, 46 which close the half-shell 2 and are provided with two hooks 8 which engage into the grooves 7 of the half-shell 2 for retention.

Figure 8A:
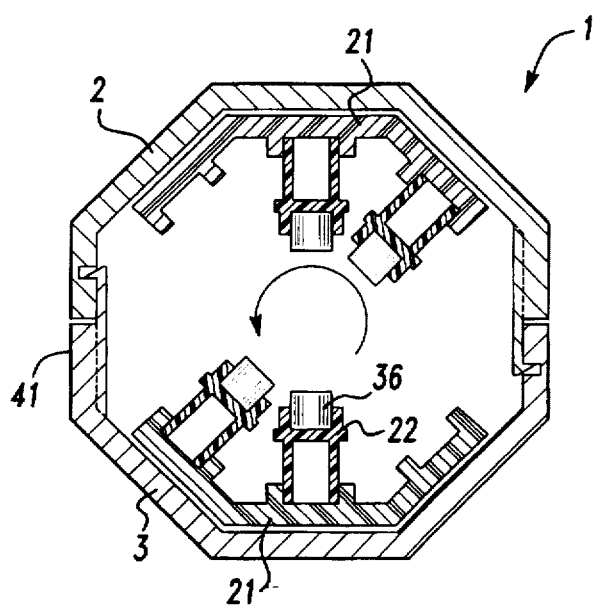
FIGS. 8A–8C show three further sectional side views according to FIG. 6.
Figure 8B:
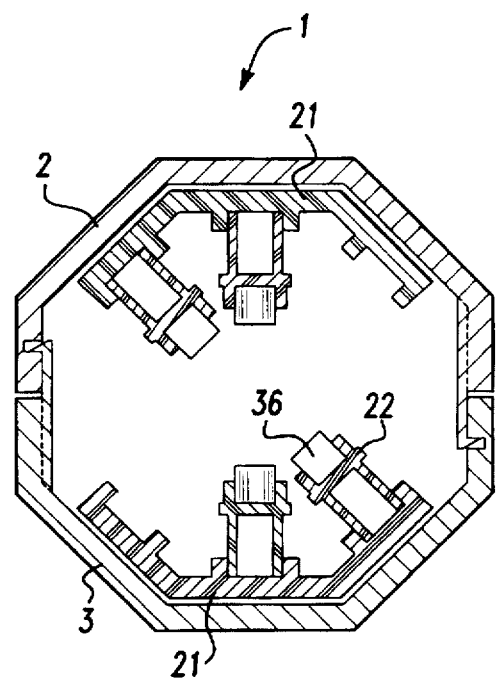
Figure 8C:
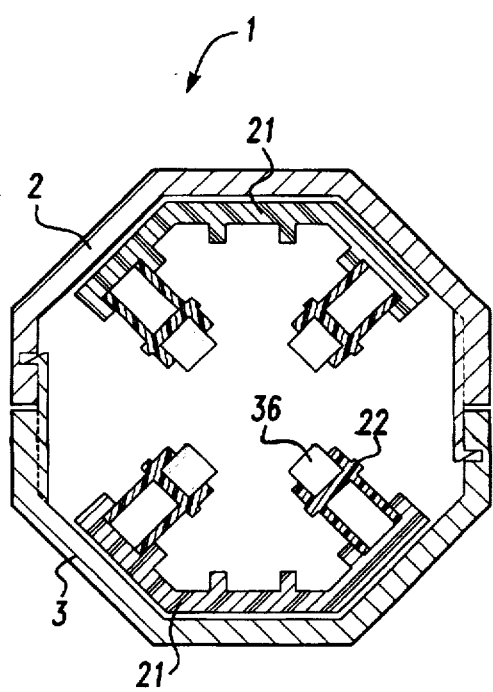

FIG. 8 shows three sectional side views of a housing 1 according to FIG. 4 with, in each case, two half-shells 2, 3 and the orientation retainer 21 partially fitted with magnets 36. Inside a housing 1 or a half-shell 2, 3, a plurality of pole planes with short bar magnets or round disk magnets may be arranged in the longitudinal direction of the support body 35, it being possible for each pole plane to be fitted in a different manner, as shown in FIG. 8. With the assumption that the circular cross section of the sectional side view of the housing 1 starts at zero degrees with the contact face 41 and the magnets 36 are selectively arranged at 45, 90 and 135, or those opposite at 225, 270 and 315 degrees, it is possible, for example, when fitting in the first and fourth pole planes at 45 and 90 degrees, left partial figure, and fitting in the second and fifth pole planes, middle partial figure, at 90 and 135 degrees, and fitting in the third pole plane, right partial figure, at 45 and 135 degrees, to construct a substantially anticlockwise rotating field in the longitudinal direction of the support body 35.

Figure 9:
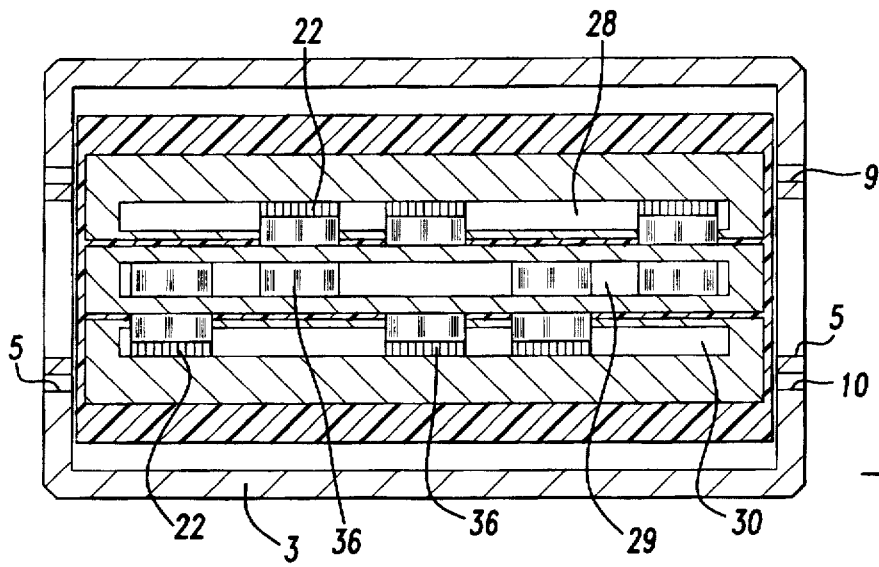
FIG. 9 shows a sectional longitudinal view of a half-shell fitted according to FIG. 8.

FIG. 9 shows an axial section through the housing 1 according to FIG. 8, from which the described arrangement of the five pole planes can be seen, the first pole plane being arranged on the left and the fifth pole plane being arranged on the right. It can be seen from this representation that the first and fourth or the second and fifth pole planes are fitted in the same way. Likewise, the cavities 28, 29 and 30 for holding the magnet supports 22 can be seen with an axial extent. The lateral end faces of the half-shell 3 furthermore have the central cavity 5 for the support body and grooves 9, 10 for rotationally fixed locking with neighboring housings 1.

Figure 10:
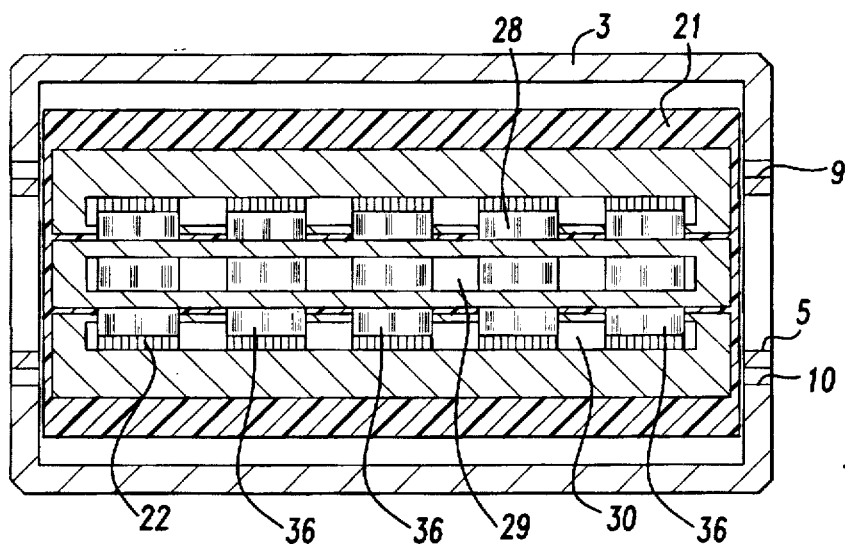
FIG. 10 shows a further sectional longitudinal view of a half-shell with full fitting.
Figure 11:
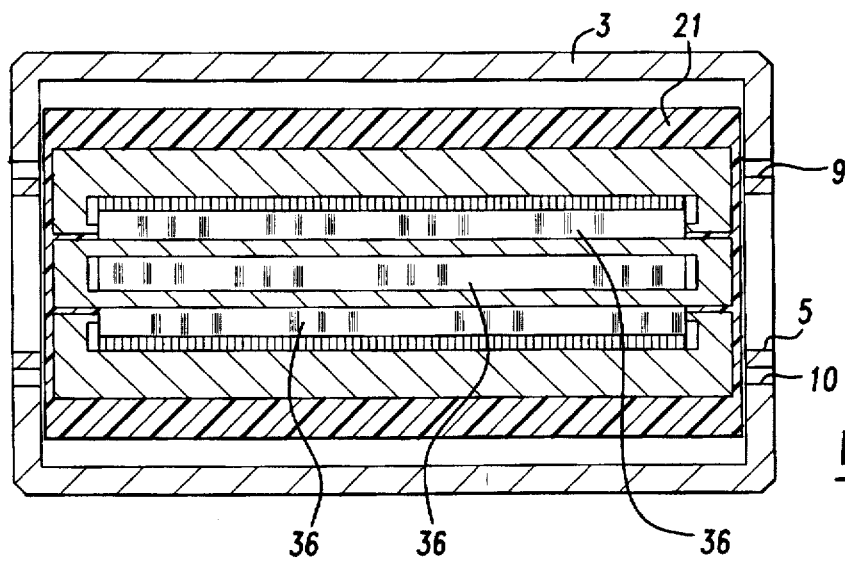
FIG. 11 shows a further sectional longitudinal view of a half-shell with full fitting.
Figure 13A:
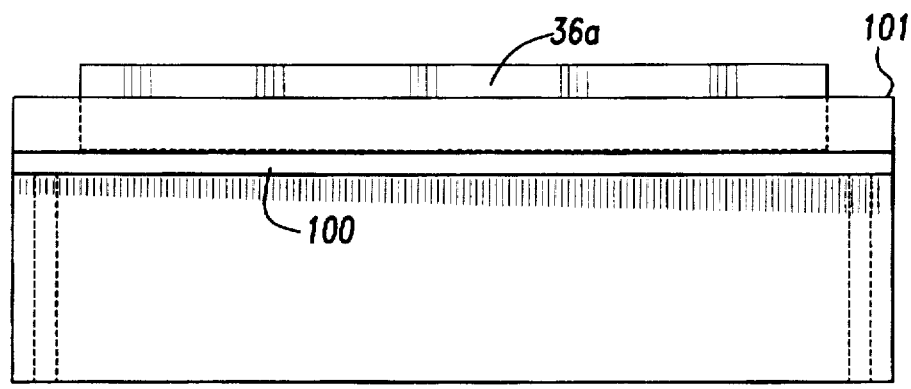
FIGS. 13A–13D show a plurality of views of a magnet support for a bar magnet.
Figure 13B:
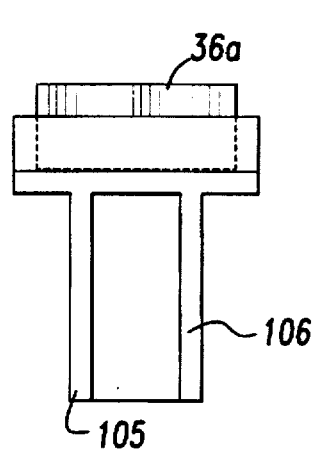
Figure 13C:
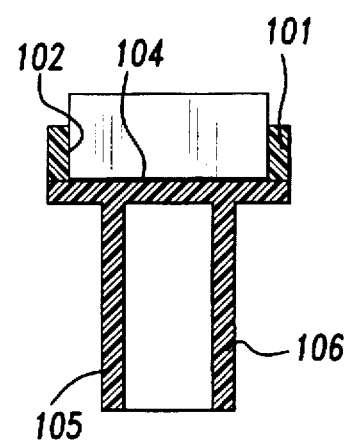
Figure 13D:
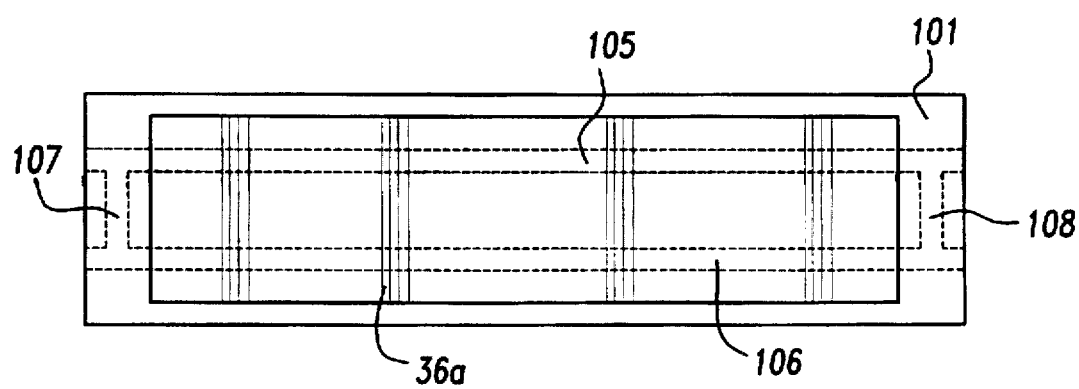
Figure 14A:
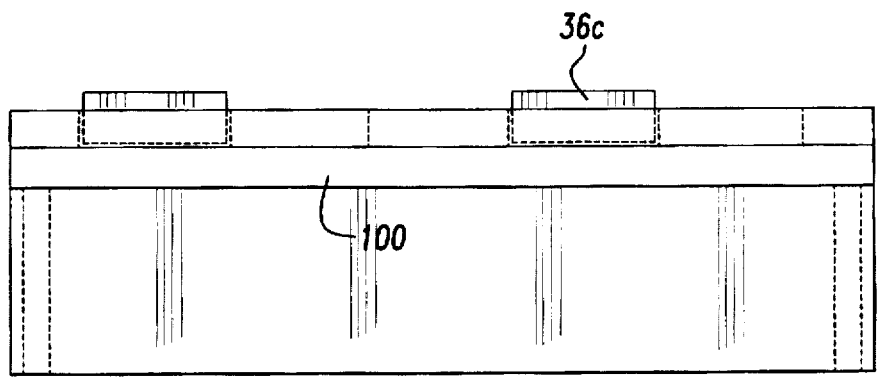
FIGS. 14A–14D show a plurality of views of a magnet support for round magnets with partial fitting.
Figure 14B:
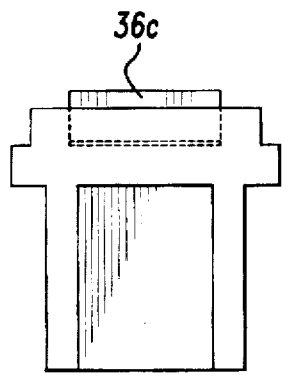
Figure 14C:
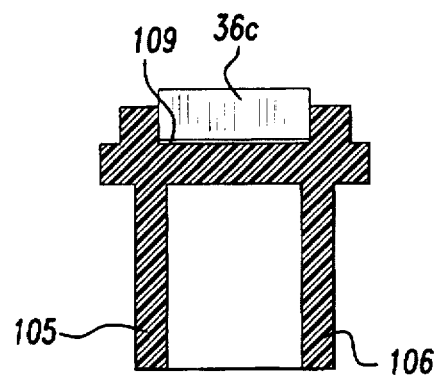
Figure 14D:
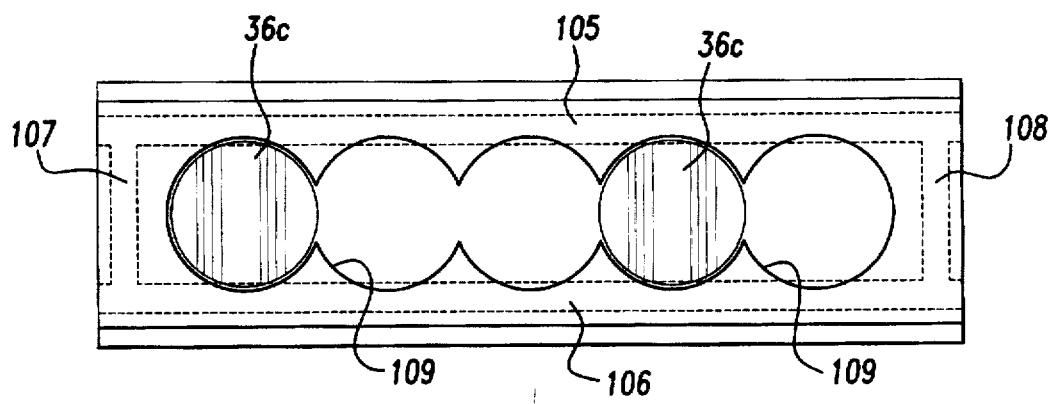
Figure 15A:
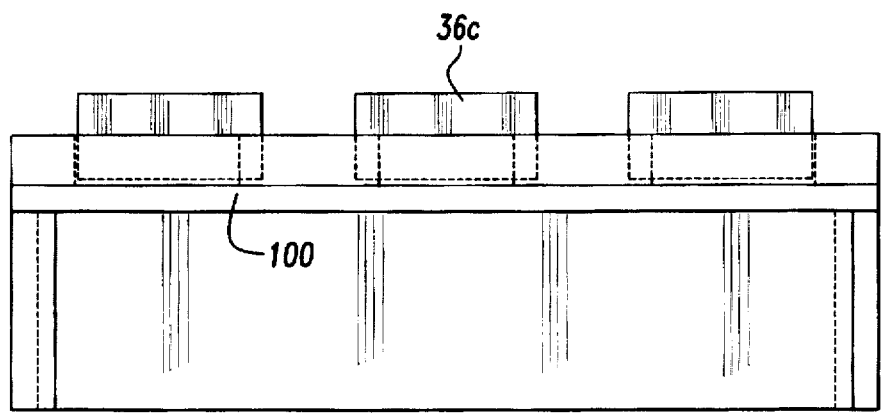
FIGS. 15A–15D show a plurality of views of a further magnet support according to FIG. 14.
Figure 15B:
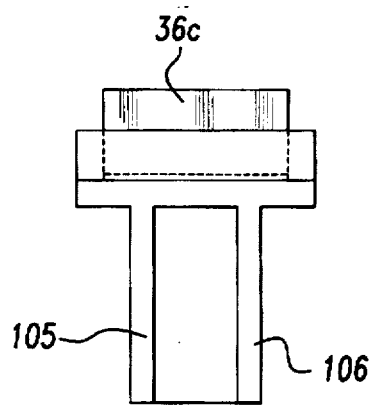
Figure 15C:
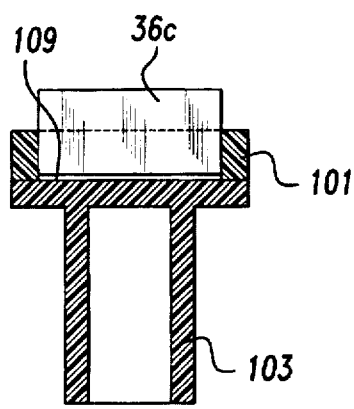
Figure 15D:
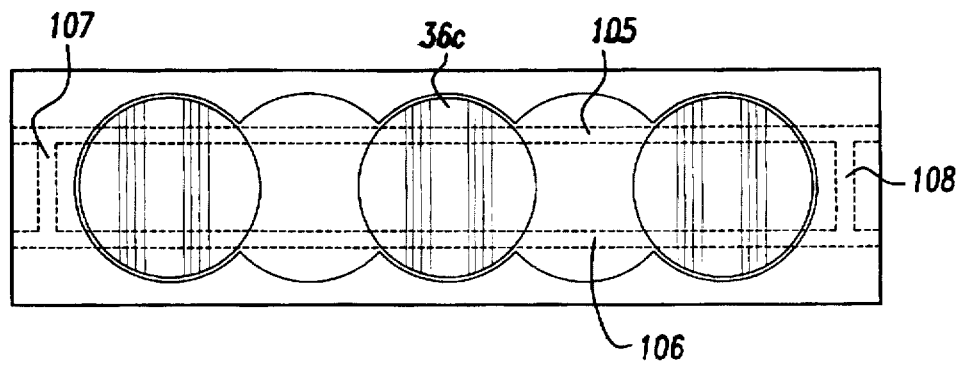

FIGS. 10 and 11 show further axial sections according to FIG. 9, fitted differently. FIG. 10 shows, for example, full fitting of the housing 1 with magnets 36 in five pole planes, while FIG. 11 shows full fitting with bar magnets 36 in one pole plane, which magnets are in each case fastened using a corresponding number of magnet suports 22 in an orientation retainer 21.

Overall, the partial figures in FIGS. 6 to 8 and FIGS. 9 to 11 show that the housings 1 can be fitted in widely varied fashions and individual matching to various fluids and requirements is thereby possible.

FIG. 12 shows a selection of usable permanent magnets 36, with which the housing 1 can be fitted. This figure shows, from left to right, a bar magnet or block magnet 36a, three cuboid magnets 36b with a different overall height, and two disk-shaped magnets 36c with a different overall height and a different diameter.

FIG. 13 shows a plurality of views of a magnet support 100 for bar or block magnets 36a, the magnet support 100 being designed in two parts, with a first part 101 which has a rectangular groove 102 for holding the permanent magnet 36a and is adhesively bonded to a second part 103 which has a plane surface 104 onto which the first part 101 can be adhesively bonded, and two webs 105, 106 as well as two further stiffening webs 107, 108. The webs 105, 106 are intended for fitting into the cavity 28, 29 or 30 in the orientation retainer 21. The webs 105, 106 may vary in length depending on the permanent magnet 36 and support body 35 used. Likewise, the length of the magnet support 100 may vary in the axial direction depending on the application case.

FIG. 14 shows a plurality of views of a magnet support 100 for disk-shaped permanent magnets 36c, the magnet support 100 having five circularly rounded indentations 109, adjacent to one another, which are fitted with only two magnets 36c. In contrast to the embodiment according to FIG. 13, the magnet support 100 is designed monobloc and has, below the indentations 109, two integrally molded webs 105, 106 and stiffening webs 107, 108 which differ in terms of material thickness from FIG. 13.

FIG. 15 shows a plurality of views of a magnet support 100 for round permanent magnets 36c according to FIG. 14, again in a two-part embodiment, with a first part 101 and a second part 103 which are adhesively bonded to each other. In the first part 101 there are five circularly rounded indentations 109 adjacent to one another, which are alternately fitted with, in all, three magnets 33c, it being possible for the height of the magnets 36 to be matched to the support body 35.

FIG. 16 shows a full view and a sectional partial view of a support body 35 with two adjacently arranged housings 1 which have a design according to FIGS. 2 and 4, the two housings being held at a particular mutual separation by two spacers 120 which engage in the grooves 9, 10 of the half-shells 2, 3. The spacers 120 are here simultaneously used for rotational securing, so that the housings 1 are held rotationally fixed on the support body. The housings 1 are positionally fixed axially on the support body 35 either by clamping of the support body 35 or by other described auxiliary means.

FIG. 17 shows a system 130 for spacing and rotational securing, which is used in the case of a housing 1 having two half-shells 2, 3 according to FIG. 2. The upper-right partial figure shows the arrangement of the two half-shells 2, 3 with cavities 9, 10. The left partial figures show three views of the separation and rotational securing sytem 130, which comprises a semicircular tube half-section 131 which has a larger diameter than that of the support body 35, so that the separation and rotational securing system 130 can be placed between two housings 1 over the support body 35 as, in particular, can be seen from the lower-right partial figure. Two axial extensions 132, with one nose 133 in each case, are integrally molded at the curve end onto the tube half-section 131 on both side ends. The extensions 132 with the noses 133 engage behind the end wall of the half-shells 2, 3 by means of the grooves 9, 10, so that a separation, predetermined by the width of the tube half-sections 131, of the housings 1 or half-shells 2, 3 is retained and rotation of the two housings 1 with respect to one another is simultaneously prevented.

The FIGS. 18 to 23 show the arrangement of a plurality of housings 1 on a support body 35 with different fitting of the orientation retainers 21 with magnet supports 22 and magnets 36, in longitudinal section. The housings 1 are arranged selectively in series or in parallel or in a combination of the two on the support body 3 or 144.

FIG. 18 shows, in the upper partial figure, a support body 35 with screw connections 140 and two housings 1 which are fully fitted on the left but only partially fitted on the right. The two housings 1, of equal length, are mounted on the support body 35 separated from each other. In the central partial figure, a total of three housings 1 with different overall length, fitted differently and with different magnets 36 are shown on a longer support body 35, a separation and rotational securing system 120 being arranged between the housings 1. In contrast, in the lower partial figure the housings 1 with different overall length are not separated, but touch one another via their end faces. Rotation can in this case be prevented by engagement of a projection on the end face into one of the grooves 9, 10 of the neighboring end face. In addition, in the central and lower partial figures, there is in each case an annular securing system 141, for fixing the axial position of the arrangement, on the end of the arrangement of housings 1.

FIG. 19 shows, in the upper partial figure, an arrangement of three housings 1 on a support body 35 with a separation and rotational securing system 120, the three housings 1 being in each case fully fitted with magnets 36. In the central partial figure, a comparable arrangement with only two housings 1 is shown, while the two lower partial figures in each case show only one differently fitted housing 1 on the support body 35.

FIG. 20 shows, in the upper partial figure, an arrangement of three housings 1, comprising in each case one half-shell 1 with a cover 42, which are fully fitted with magnets 36. The housings 1 are not separated and are held positionally fixed via two annular securing systems 141 on the support body 35 by two screw connections 140. In the central and lower partial figures, a comparable arrangement with only one housing 1 is shown, the fittings being carried out differently, and a flange connection 142 with a sealing disk 143 being provided in the lower partial figure instead of a screw connection 141.

Figure 21:
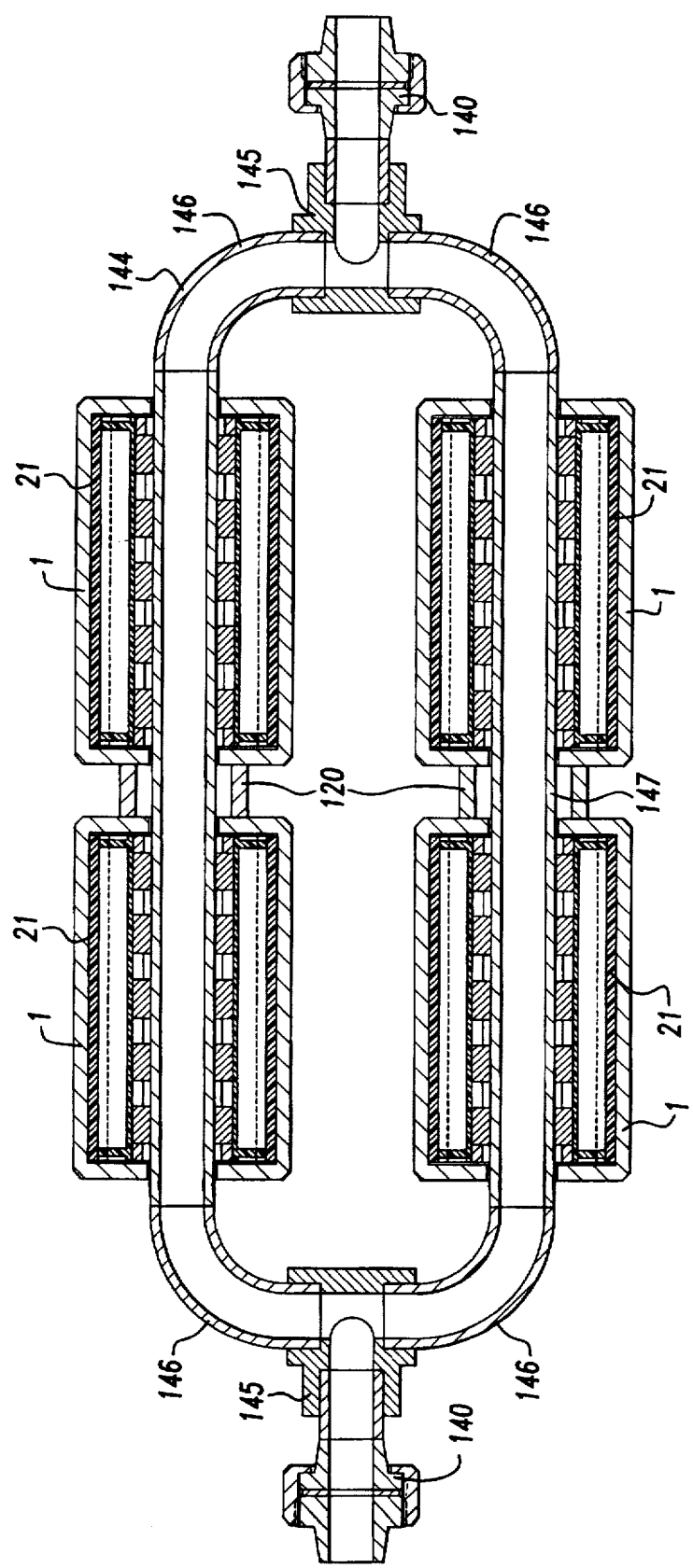
FIG. 21 shows a sectional side view of a support body with distribution into two partial streams and, in each case, two adjacent housings.

FIG. 21 shows an arrangement of four housings 1 on a support body 144 with screw connections 141, which support body comprises two T-shaped junction parts 145, four bend parts 146 and two parallel straight tube parts 147 and divides the fluid stream in two. On each straight tube part 147 there are two housings 1 fitted with magnets 36 in the same way. The whole fluid treatment device can be used as a replacement for an existing tube piece in the tube system and permits, as required, treatment with a higher efficiency.

Figure 22:
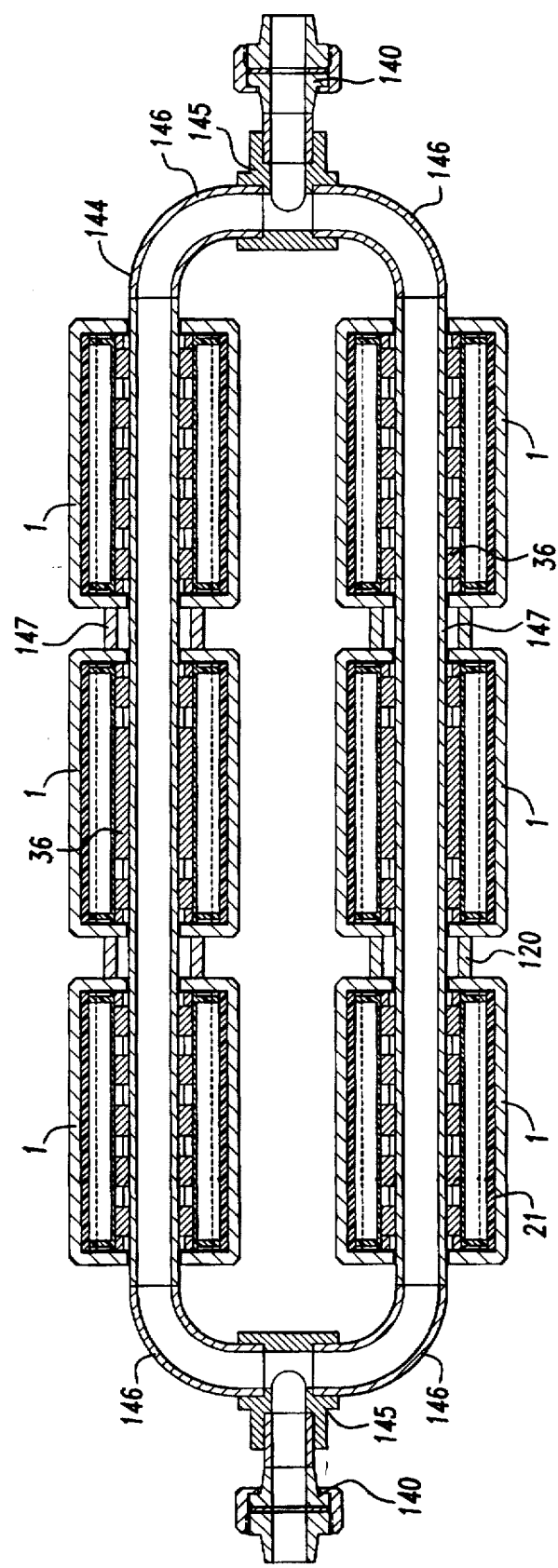
FIG. 22 shows a sectional side view according to FIG. 21 with in each case three adjacent housings.

FIG. 22 shows an arrangement of six housings 1 according to FIG. 21 fitted differently with magnets 36, the straight tube parts 147 being designed longer, so that three housings 1 can in each case be held. The length of the straight tube parts 147 should be designed according to requirement, so that even more than 2 or three housings 1 can be fastened on the tube part 147. It is also conceivable for more than two bifurcations of the fluid stream to be employed, so that, if appropriate, a substantially higher number of housings 1 may be provided.

Figure 23:
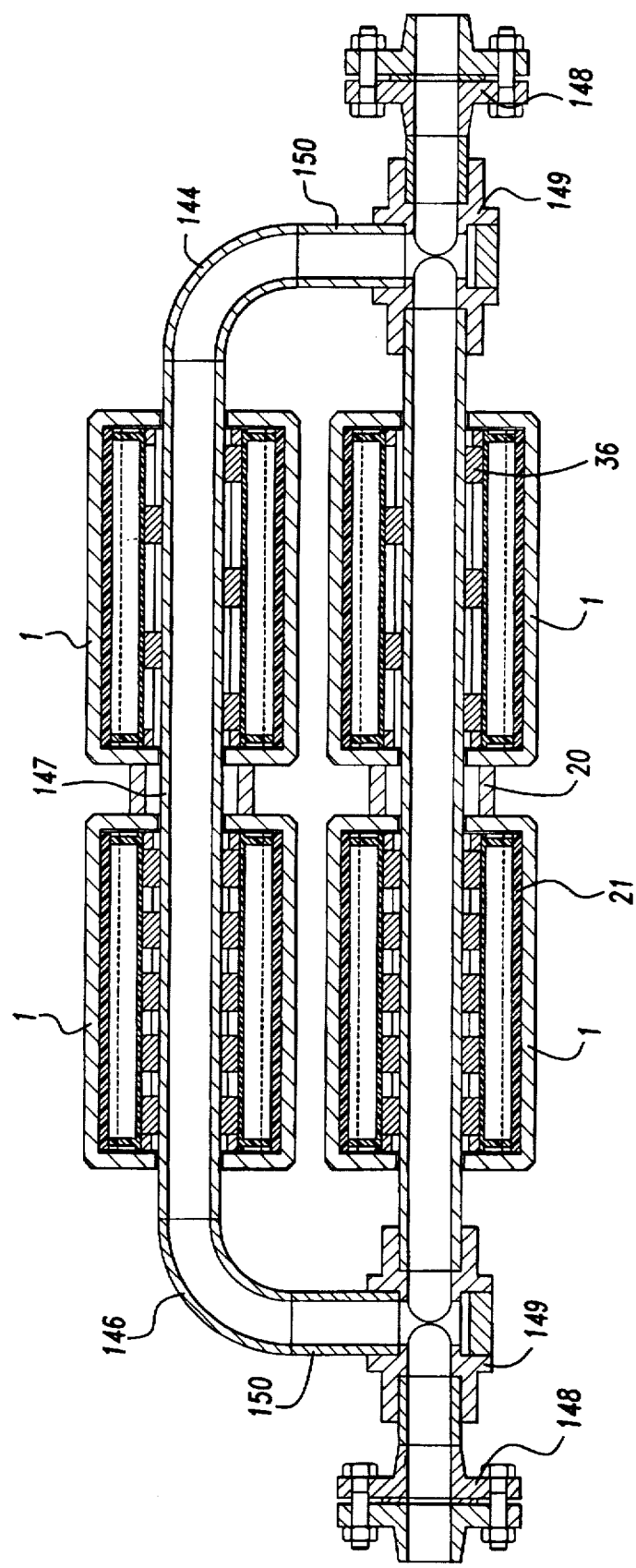
FIG. 23 shows a sectional side view according to FIG. 21 with in each case three adjacent housings and an alternative form of the support body.

FIG. 23 shows, by way of example, an arrangement of four housings 1, fitted differently, in a combination of series and parallel connection on a support body 144 with welding neck flanges 148. The support body 144 comprises, in this exemplary embodiment, two cross-shaped junction parts 149, two short straight tube parts 150, two bend parts 146 and two parallel tube parts 147 of different length. Two further short tube parts 150 with bend parts 146 and a straight tube part 147 could, if appropriate, be connected to the cross-shaped junction part, in order for it to be possible to divide the fluid stream into three.

I claim:

1. A device for magnetically treating a fluid, comprising:
   a conduit coaxially surrounding a longitudinal axis for carrying said fluid, said conduit defining an exterior surface;
   a first shell defining a first cavity partially surrounding a portion of a circumference of the exterior surface of said conduit;
   securing means surrounding a remaining portion of said circumference for securing said first shell to said conduit;
   connecting means for connecting said securing means to said first shell;
   a first orientation retainer member positioned within said first cavity, wherein said first retainer member includes a plurality of first grooves facing the exterior surface of said conduit, said first grooves having respective major axes that are parallel the longitudinal axis of said conduit, and wherein said first grooves are circumferentially spaced apart from one another about the longitudinal axis of said conduit;
   at least one first magnet support member disposed within one of said first grooves in said retainer member, wherein said first magnet support member includes a first cavity facing the exterior surface of said conduit; and
   at least one first permanent magnet disposed in said first cavity, said first magnet having one pole surface positioned adjacent the exterior surface of said conduit.

2. The device according to claim 1, wherein said securing means comprises a second shell defining a second cavity surrounding said remaining portion of the circumference of the exterior surface of said conduit, said first and second shells together defining a housing that coaxially surrounds said conduit, a second orientation retainer member positioned within said second cavity, wherein said second orientation retainer member includes a plurality of second grooves facing the exterior surface of said conduit, said second grooves having respective major axes that are parallel the longitudinal axis of said conduit, and wherein said second grooves are circumferentially spaced apart from one another about the longitudinal axis of said conduit, at least one second magnet support member disposed within one of said second grooves in said second retainer member, wherein said second support member includes a second cavity facing the exterior surface of said conduit, and at least one second permanent magnet disposed in said second cavity, said second magnet having one pole surface positioned adjacent the exterior surface of said conduit.

3. The device according to claim 2, further comprising a plurality of said housings axially spaced apart from one another along the exterior surface of said conduit.

4. The device according to claim 3, further comprising means for preventing rotation of said housings in relation to one another about the longitudinal axis of said conduit.

5. The device according to claim 2, wherein said housing has an octagonal shape cross section.

6. The device according to claim 2, wherein said connecting means comprises a hook disposed one of said shells for engaging a groove in the other of said shells.

7. The device according to claim 1, wherein said conduit is made of a non-magnetic material.

8. The device according to claim 1, wherein said pole surface is curved to conform with the exterior surface of said conduit.

9. The device according to claim 1, wherein said securing means is a cover plate.

10. The device according to claim 9, wherein said connecting means comprises a hook disposed said first shell for engaging a groove in said cover plate.

11. The device according to claim 1, wherein said orientation retainer member includes three of said grooves, and wherein the major axes of said grooves are circumferentially spaced 46 degrees apart from one another about the longitudinal axis of said conduit.

12. The device according to claim 1, wherein the pole face of said magnet abuts the exterior surface of said conduit.

* * * * *